United States Patent [19]

Anderson et al.

[11] Patent Number: 5,027,395
[45] Date of Patent: Jun. 25, 1991

[54] DATA-LOCKING SYSTEM

[75] Inventors: Richard J. Anderson, Morristown; Bruce J. Goodman, Livingston, both of N.J.; Robert T. Riggio, Staten Island, N.Y.; Solomon Kopolovics, Brooklyn, N.Y.; Lisa C. Hernandez, New York, N.Y.; Chengkuo Chen, Somerset, N.J.; Russell J. Romei, Williston Park, N.Y.

[73] Assignee: Metropolitan Life Insurance Company, New York, N.Y.

[21] Appl. No.: 541,256

[22] Filed: Jun. 20, 1990

[51] Int. Cl.⁵ .............................................. H04L 9/00
[52] U.S. Cl. ......................................... 380/4; 380/3; 380/25
[58] Field of Search .................................. 380/3, 4, 25

[56] References Cited

U.S. PATENT DOCUMENTS 4,588,991 5/1986 Atalla ........................................ 380/4
4,905,277 2/1990 Nakamura ................................. 380/4
4,947,318 8/1990 Mineo ...................................... 380/4
4,959,861 9/1990 Howlette ................................. 380/4

Primary Examiner—Thomas H. Tarcza
Assistant Examiner—David Cain
Attorney, Agent, or Firm—Kenyon & Kenyon

[57] ABSTRACT

A data-locking system for generating an application, includes a data entry device, a video display screen, a storage medium, and a system for locking data in the storage medium. The video display screen allows for the display of inputted information in a predetermined application format comprising an integrated arrangement of critical and non-critical data fields. The data-locking system has circuitry for generating first and second records from the inputted information, as well as circuitry for generating a unique generator key number for encrypting the first record and circuitry for generating a data-lock code number and a time stamp number. When using the data-locking system, the inputted information in the critical data fields of the predetermined application format, once data-locked, cannot be changed.

44 Claims, 2 Drawing Sheets

1

DATA-LOCKING SYSTEM

FIELD OF THE INVENTION

The present invention relates to a data-locking system for electronically locking information contained therein. More particularly, this invention relates to a system for storing and securing information. Still more particularly, this invention relates to a system for maintaining data integrity throughout an application evaluation process.

BACKGROUND INFORMATION

As is known, applications for insurance or financial services sometimes require an account representative to visit with a prospective client in order to obtain and record relevant information in writing, and to obtain a signature of the prospective client as to the accuracy of the information recorded before returning from such point-of-sale to a centralized location for processing of the application. It has also been known to use portable keypads and printers to record the information provided by an applicant for an application process. However, such devices merely record information without securing it from access and manipulation by others. Also, the use of printing devices by account representatives during the application process with a client has fallen into disfavor as such on-site printing can lead to multiple requests of illustrations as to costs for specific services, and create logistical problems sourced in excessive equipment and maintenance thereof.

Furthermore, after an application has been actually printed and signed by an applicant, changes to non-pertinent information in the Application usually have required amendment paperwork or initialing by the applicant.

Accordingly, an object of this invention is to eliminate the need to provide for an on-site printer at a point-of-sale in an application process.

It is another object of this invention to avoid tampering with data entered into a data entry device.

It is another object of this invention to prevent a system user from changing certain predetermined application information entered into a processing system.

It is another object of this invention to allow a system user to modify predetermined non-critical portions of an application with information obtained subsequent to a point-of-sale.

It is another object of this invention to enable a system user and an applicant to realize the briefest possible application for obtaining insurance.

It is another object of this invention to reduce the need for manual amendment form handling, thereby eliminating the need for unnecessary correspondence.

SUMMARY OF THE INVENTION

Briefly, the invention provides a data-locking system with electronic data storage capabilities.

The data-locking system is comprised of a portable data entry device, for example a portable personal computer having a video display screen, a keyboard, and a storage medium to store information inputted to the data entry device as well as means for locking at least some of the inputted information in the storage medium.

The data-locking system may also include circuitry which is programmed to display portions (i.e., data fields) of an application format on the video display screen in a sequence that facilitates the inputting of information into the storage medium corresponding to the displayed data fields on the video display screen. This sequencing program allows a system user to enter data or view portions of the application format without having to follow a particular order. The application format may be subdivided into format blocks containing, for example 10 data fields, so that the system user can move between blocks during the data entry or viewing process.

The video display screen is sized, for example, to display at least one predetermined application format such that a system user can merely enter data in available fields contained in the predetermined application format.

The means for locking in information includes circuitry which is programmed by suitable software so that the information provided in preselected data fields within the predetermined application format can be data locked. In this respect, once a data presence has been determined in preselected data fields, the data locking process is allowed to proceed, wherein data present in the preselected data fields is stored within the storage medium of the portable data entry device.

Prior to initiation of a data-lock, the information contained in the preselected data fields of the predetermined application format is stored in a first record, or non-critical data file located within the storage medium of the portable data entry device. From the information contained in preselected data fields of the non-critical data file another record is created upon initiation of a data lock. This new second record becomes a critical data file. Prior to the creation of the second record, the non-critical data file must be accessed and electronically manipulated. The manner in which this is accomplished is by a variety of circuits programmed to perform specific functions. For example, the data-locking system includes encrypting circuitry, sequencing circuitry, first record circuitry, CRC circuitry, data-lock code circuitry, time stamp circuitry, lockout circuitry and generator key number circuitry.

The first record stored in the storage medium is an electronic file containing all of the information entered into the data fields of the predetermined application format. This is stored as a non-critical data file and can be accessed by a system user at any time subsequent to a data lock.

The second record is an electronic file containing only some of the information contained in the preselected data fields of the predetermined application format, for example, information required for underwriting purposes for an insurance policy application. This is stored as a critical data file and is inaccessible, for editing purposes, to a system user subsequent to a data-lock. The information can, however be viewed on the video display screen of the portable data entry device once the information is data-locked.

Further to the creation of two distinct electronic records, the data-locking system secures the data-locked second record by encrypting the information contained in the preselected data fields of the predetermined application format prior to creating the second record. Also, when a data lock is effected by a system user, the system will generate a unique data-lock code number using the information contained in at least one preselected data field of the predetermined application format. Once generated, this data-lock code number is made part of the critical data file and is similarly encrypted and stored within the portable data entry device.

The generation of the data-lock code number is governed by an algorithm which combines the contents of certain preselected data fields in a predetermined manner. The algorithm may, for example call for the creation of first temporary numbers and the further manipulation of those first temporary numbers resulting in the data lock code number.

A unique generator key number is also created upon the initiation of a data-lock. This unique generator key number is critical to the security of the system and acts as the "key" to the encryption of the non-critical data file in forming the critical data file. The unique generator key number is combined, in a predetermined manner, with each value contained in the critical data file to form an encrypted version of that value. The unique generator key number is itself a predetermined combination of predetermined data fields of the non-critical application. For example, the unique generator key number can be the addition or multiplication of a portion of a data lock code number and a portion of a time stamp number.

The encryption of data in the non-critical data file is also governed by an algorithm. An essential part of the encryption of data to create the critical data file is the unique generator key number. The encryption algorithm calls for a predetermined combination of the values contained in the critical data fields of the non-critical data file with the unique generator key number. The encryption algorithm may, for example, create a second temporary number comprising portions of the unique generator key number and further combine the second temporary number in a predetermined manner with portions of the value to be encrypted. Such can even be implemented on a bit by bit basis.

The initiation of a data-lock triggers the data-locking system to generate a time stamp number including the day, month, year, hour and second that the application contents were data-locked. The source of such information as to the day, month, year, hour and second of the initiation of a data-lock can be an internal pre-set or programmable timing unit. The time stamp number is made a part of the critical data file and is similarly encrypted and stored within the data entry device.

The time stamp number and the data-lock code number can both be displayed on the video display screen of the portable data entry device subsequent to a data lock.

The system also includes a comparator device for comparing the contents of the critical data record and noncritical data record, the comparator being located, for example in the data entry device. The comparator is constructed to receive the data contained in the two records and compare that data on a bit by bit basis. The critical data file is received in an encrypted format however, the non-critical data file must first be encrypted before being compared with the critical data file. A successful comparison depends upon the encryption of the non-critical data file, in accordance with the same encryption algorithm as used to create the critical data file, matching the critical data file. The comparison, therefore, of the encrypted non-critical data file with the critical data file is a comparison of encrypted data.

Should the comparison of the two records yield a match within the comparator, the contents of the non-critical data file can be passed to a printer. The printer can then print an application in accordance with the predetermined application format, clearly displaying on each page of the application, the corresponding time stamp number and data lock code number. Additionally, should the encrypted contents of this file match the contents of the critical data file, such contents can be electronically transmitted to another processing location to initiate an application review.

Should the comparison of the two records yield a mismatch, the system will terminate the application process and will require the intercession of predesignated personnel to continue any further evaluation of the application. Such a termination of the application process is essentially a lockout of program accessibility.

A system lockout condition renders access to the data-locking system by other than designated personnel, impossible. In order to effect a system lockout in appropriate situations, the data entry device contains lockout circuitry which is programmed to render the data locking system inoperative, subject to the intervention of designated personnel.

As a further security measure, the data-locking system can contain a cyclical redundancy check to determine if tampering has occurred with the information contained in the critical data fields of the critical and non-critical data files. The cyclical redundancy check (CRC) calls for the contents of the critical data fields of the non-critical data record to be converted into numerics and combined in a predetermined manner. The algorithm employed for the calculation of the CRC may, for example, provide for the values contained in the critical data fields of the non-critical data file to be combined with a first and second constant, the result of such combination being used as an index to predetermined values stored in a lookup table.

The cyclical redundancy check (CRC) will result in an alphanumeric number which is encrypted and made part of the critical data file. A CRC number is generated in three distinct situations. When a data lock is requested, a CRC number is generated, as well as when a system user wants to either print an application or electronically transmit an application's contents to a remote processing location. The CRC numbers generated in either of the latter two situations must match the original CRC number generated when creating the critical data record or a lockout will take place.

These and other objects and advantages of the invention will become more apparent from the following detailed description taken in conjunction with the accompanying drawings wherein:

PREFERRED EMBODIMENT FOR CARRYING OUT THE INVENTION

Figure 1:
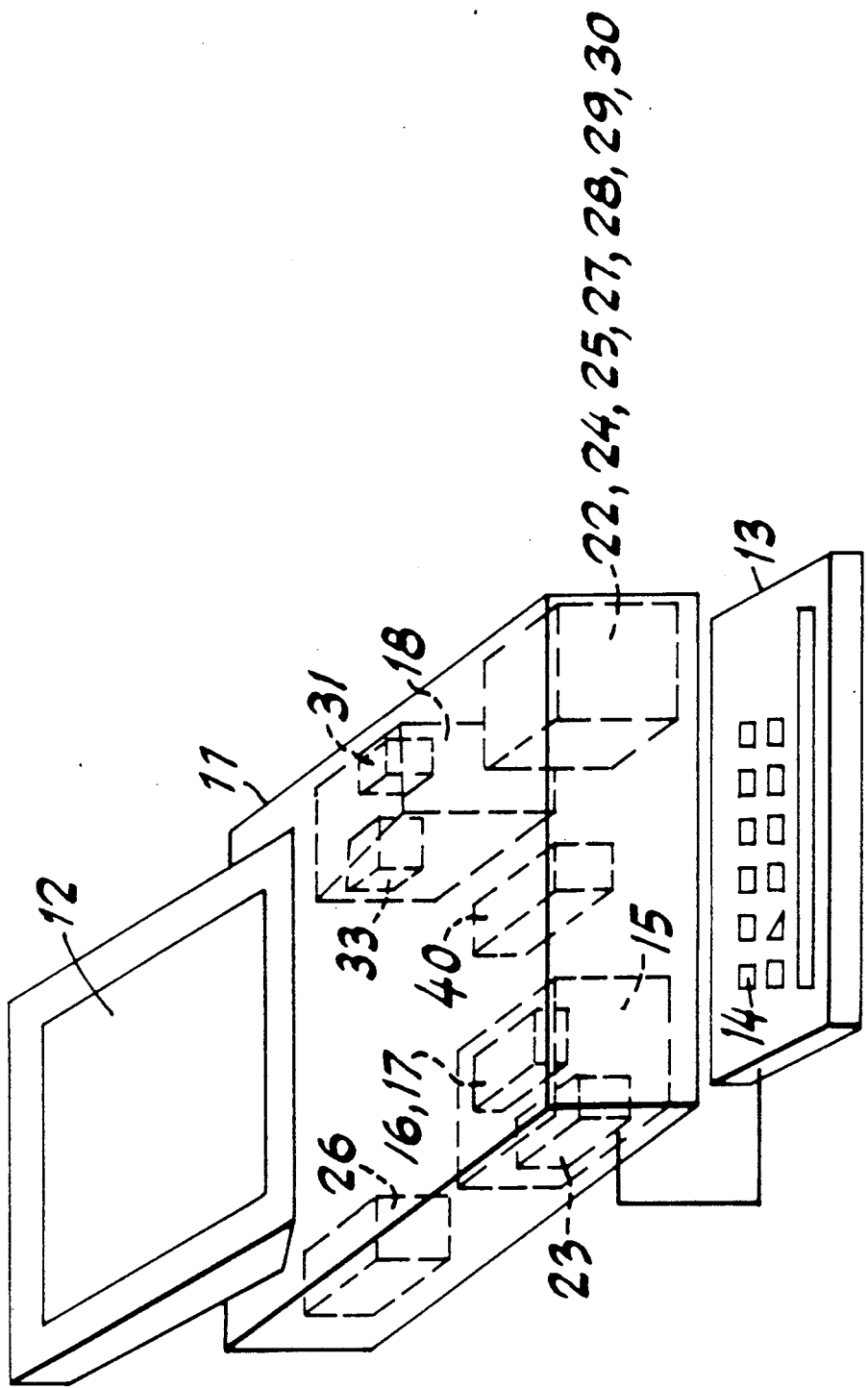
FIG. 1 schematically illustrates a computer system having a data-lock function and an information storage medium together with a display medium in accordance with the invention.

Referring to FIG. 1, the data-locking system 10 includes a portable data entry device 11 equipped with a video display screen 12 and a keyboard 13. The data-locking system 10 may also include a data-locking key 14 to initiate a data-locking process and an electronic storage medium 15 to store inputted information as described below. An electronic storage medium in the form of a disk can also be removably insertable in the data entry device 11 for the transfer of information. The storage medium 15 may also be a RAM memory. Similarly, the storage medium 15 can be accessible through a suitable transmission medium (i.e. a cable).

The data entry device 11 may comprise lap top computer models such as the Honeywell Bull APL model 286 Supersport or model SXL 386 SX Supersport; or other personal computing devices.

The data-locking system 10 may also include sequencing circuitry 22 which is programmed to display portions of a predetermined application format on the video display screen 12 in a sequence to facilitate data entry into the storage medium 15. As information is entered into the data entry device 11, the information is stored in the storage medium 15 and coincidentally displayed on the video display screen 12 in a predetermined data field. As these data fields are filled, the sequencing circuitry 22 is programmed to display the next data field in the sequence on the video display screen 12. The sequencing circuitry 22 is also programmed to allow a system user to scroll up or down in the predetermined application format.

The data-locking system 10 can be provided with sequencing circuitry programmed to display portions of the predetermined application format in block format. Each block can, for example contain ten or more data fields. The programming would ensure that a system user could access any of the application blocks without adhering to a fixed sequence of screen displays.

The keyboard 13 enables a system user to enter data from an applicant, according to a predetermined application format, in the storage medium 15 located within the data entry device 11. The application format is concurrently displayed on the video display screen 12 facilitating the verification of applicant data by both system user and applicant. The application format integrates critical data and non-critical data and distinguishes between the two, for example, by the use of an asterisk or some other predetermined marking next to categories intended to contain critical data. Critical data is defined as that which is used in an evaluation of an application and that which is indispensable to such evaluation for example, for underwriting purposes.

In order for the system to be implemented, an applicant must supply a system user with a minimal amount of information comprised at least of the critical data. The data locking system 10 also includes first record circuitry 23 which is programmed to generate a first record by directing inputted information into the storage medium 15 in memory locations corresponding to predetermined data fields. Once all such critical data is entered in the appropriate predetermined data fields of the application format, the applicant is free to review such information for accuracy and completeness by referring to the displayed application format on the video display screen 12 of the portable data entry device 11. The system user may also review the application format prior to requesting that such information be data-locked.

Data-locking is defined as the process by which critical data entered into the data entry device 11 through the keyboard 13 is frozen, exactly as entered, in the storage medium 15. Data-locking provides for the storage of two data records for each application entered in the storage medium 15. A first record corresponding to the non-critical data is stored in unencrypted format in the storage medium 15 while the second record corresponding to the critical data is stored in an encrypted format in the same storage medium 15, or different, storage medium 40 located within the portable data entry device 11.

Once the applicant and system user are satisfied that all inputted critical and non-critical data are accurate, the system user can request, via the software of the system, to initiate a data lock by inputting a suitable command via the data-lock key 14 i.e. a function key. Data-locking can also be effected by a series of responses to a menu driven program included as part of the programming of the sequencing circuitry 22. Therefore, a specifically designated data-lock key 14 is not an absolute necessity.

The data-locking system 10 will check the contents of the critical data sections of the application before allowing or disallowing the data-lock to take place. If all the data fields predetermined to contain critical data are not completed, the data-locking system will not allow a data-lock to take place. Conversely, if all appropriate data fields predetermined to contain critical data are properly completed, the data-locking system will initiate a data-lock.

Figure 2:
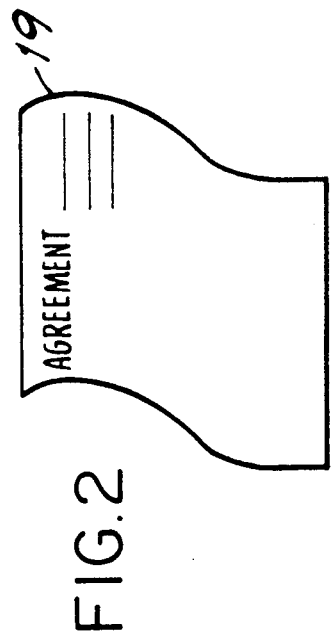
FIG. 2 illustrates an agreement form having provisions for a data-lock code, a time stamp and signature in accordance with the invention.

The process of data-locking includes the generation of a unique data-lock code number 16 and a time stamp 17 for the application intended to be data-locked (see FIG. 2).

The data-lock code number 16 is derived from preselected data fields contained in the predetermined application format. This data-lock code number 16 is produced by virtue of combining values of predetermined entries in preselected data fields within the critical data segments of the application. An algorithm is used to provide for the consistent generation of the data lock code number 16. Specifically, the algorithm may call for the use of a portion of an application code number 35 (a unique number appearing on a preprinted agreement form 19) as well as a portion of at least one other value contained in a critical data field of the non-critical data file. Furthermore, the algorithm may formulate first temporary numbers from predetermined sub-portions of the portions above combining such sub-portions with predetermined data lock constants to create the data-lock code number 16.

The data-lock code number 16 generating process is appropriately implemented in hardware and software within the portable data entry device 11. The data locking system 10 includes data-lock code circuitry 24 programmed to combine the predetermined data fields in the appropriate predetermined manner to yield the data-lock code number 16. The data-lock code number 16 is also displayed on the video display screen 12 in an unencrypted format, to facilitate viewing by an applicant and system user, and is made part of the application since the data lock code number 16 is stored as a data field in the predetermined application format. The data-lock code number 16 is placed in close proximity to the time stamp 17 and is displayed on the video display screen 12 in that manner. The data-lock code number 16 is also encrypted before being made part of the critical data file located on the storage medium 15 within the portable data entry device 11.

The time stamp 17 is a representation of the day and time that the application was data-locked and appears initially on the video display screen 12 comprised of the month, followed by the day, followed by the year, followed by the hour, minute, and second at which the data-lock took place. The time stamp 17 is generated by time stamp circuitry 25 programmed to accept as an input data generated by a discrete timing unit 26 located in the data entry device 11. This time stamp 17 is then memorialized as part of the application in the storage medium 15. The time stamp 17 will appear in an unencrypted format on the video display screen 12 and in the storage medium 15 as part of the non-critical data file, while appearing in the critical data record (on the same or different storage medium) within the data entry device 11 in encrypted format, having been processed through the same encryption steps as employed to encrypt the other data fields comprising the critical data record.

The second record, or critical data file, is created from the first record, or non-critical data file. The non-critical data file is first encrypted as a security measure before being electronically written to the critical data file. The encryption procedure involves the use of two algorithms. The first algorithm produces a unique generator key number and is essentially a further manipulation of the data-lock code number 16 involving a combination of portions of the data-lock code number 16, with portions of the time stamp number 17. The unique generator key number is produced for the sole purpose of combining it, in a predetermined manner, with each of the critical data field values contained in the non-critical data file. This combination of values, using the unique generator key number, constitutes the second algorithm, or encryption algorithm.

The encryption algorithm may for example, create a second temporary number comprising the sum of each digit of the unique generated key number. This second temporary number may be further manipulated in a predetermined manner to create an encryption constant prior to the encryption constant being combined in a predetermined manner with the first bit of data contained in the critical data fields of the non-critical data file and with at least one digit of the unique generator key number. The encryption algorithm may, for example, read an Nth bit of data contained in the non-critical data file with N initially equal to 1. This Nth bit of data may then be combined with the encryption constant in a predetermined manner to create an Nth encrypted bit, before such Nth encrypted bit is written to the critical data file. The encryption constant is incremented in a predetermined manner and another bit is then encrypted, and so on until all of the data in the critical data fields have been encrypted.

The data entry device 11 includes generator key number circuitry 27 programmed to implement an algorithm as above, resulting in the creation of a unique generator key number.

The data entry device 11 also includes encryption circuitry 28 programmed to implement an encryption algorithm, similar to the one described above.

The data-locking system 10 further comprises cyclical redundancy check (CRC) circuitry 29 programmed to produce a CRC number, as a further security measure to detect tampering with data contained in either the critical data file or the non-critical data file. Upon initiation of a data-lock, the values contained in the critical data fields of the non-critical data file are combined in a predetermined manner to produce an alphanumeric number comprising, for example, four digits. The algorithm employed for the production of the CRC number includes referring to a CRC table 23 comprising a lookup table of, for example, 256 entries stored in the storage medium 15, or a different storage medium 40.

Prior to referring to the CRC table 23, the CRC algorithm may require the generation of a plurality of third temporary numbers. At least one of these third temporary number (TTN1) is produced by combining a predetermined first constant with one bit of the data value contained in at least one critical data field of the non critical data file. Another of these third temporary numbers (TTN2) may be the combination of a predetermined second constant with TTN1, and may also be used as an index for accessing the CRC table 23. The CRC number finally, may then be a combination of the indexed value from the CRC table 23 with still another third temporary number (TTN3).

The generation of a CRC number may occur in three instances: Upon initiation of a data lock; upon a direction by the system user to print an application; and upon a direction by the system user to transmit the contents of a particular application file to a remote processing location 21.

The data-locking system 10 may require, as part of the process, that the applicant acknowledge the time stamp 17 and the data-lock code number 16 for the application, as this appears on the video display screen 12 after a data-lock is initiated. This acknowledgment includes either the applicant or the system user writing such time stamp 17 and data-lock code number 16 onto an agreement form 19 (FIG. 2).

The data-locking system 10 can be implemented in a programmable portable data-entry device 11 as a software embodiment of this invention. Such an embodiment could include a computer program such as the copyrighted computer program entitled "Lap-App--Laptop Application Entry for Life Insurance - version 2 6" incorporated herein by reference.

The data-locking system 10 also comprises a comparator 18 constructed with the appropriate hardware and software to compare two data records. The comparator 18 can be used, for example when a system user initiates a printing process for an application 20, or when the contents of one or more application files are to be transmitted to a remote processing location 21.

The comparator 18 provides security enhancement to ensure that information contained in either the critical data file or the critical data fields of the non-critical data file has not been changed, or tampered with subsequent to a data-lock.

The comparator 18 may include a receiving buffer 31 to receive at least a portion of the critical data file of a particular application from the storage medium 15 or a different storage medium 40 of the data entry device 11. The receiving buffer 31 is also constructed to receive at least a portion of the non-critical data file, however only after the non-critical data file has been encrypted.

Upon initiation of either a printing process or transmission process by a system user to a remote location, the contents of the critical data fields of the non-critical data file of at least one application is processed by the encryption circuitry 28 of the data entry device 11. The resultant encrypted data record is then electronically accessed by the comparator 18 for comparison of this encrypted data record with the critical data file.

The data contained in each record must match or the comparator 18 will conclude that tampering has occurred. Once such tampering is detected, a system lockout will be initiated by the comparator 18. Such system lockout capability is incorporated into the data-locking system 10 by virtue of lockout circuitry 30 programmed to prohibit access to the system 10 upon the occurrence of a predetermined event or events. A system lockout may be overcome only by designated personnel to further enhance security.

The comparison of the encrypted data record with the critical data file can be implemented in the data-locking system 10 through comparison circuitry 33 located in the comparator 18. The comparison circuitry 33 may be programmed to perform a bit by bit comparison of data contained in corresponding data fields of the encrypted data record and the critical data file. Such comparison circuitry 33 would then be programmed to continue comparing these records until all data has been compared yielding a match, or until any single comparison of bits yields a mismatch. Upon finding a mismatch, the comparison of data would cease and a system lockout would be initiated by the comparator 18.

Figure 3:
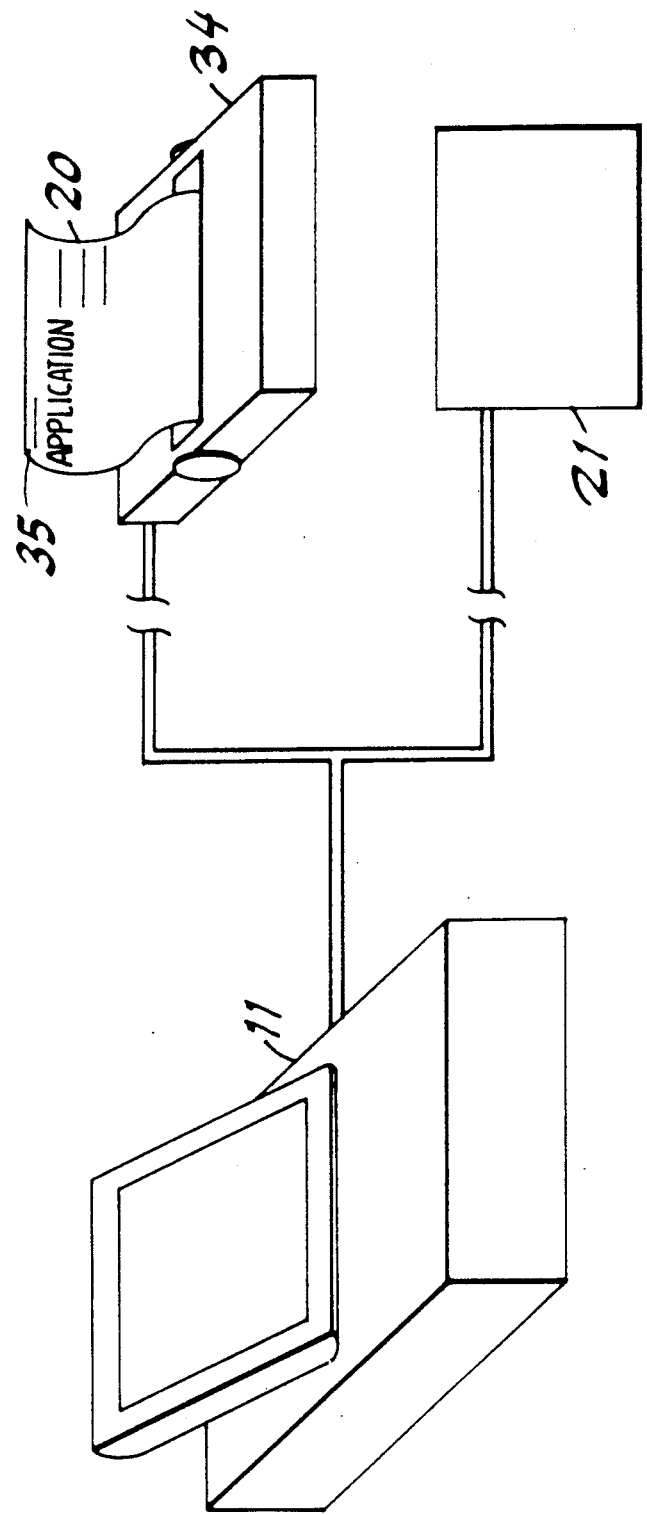
FIG. 3 illustrates a data-locking system.

Once a match of the critical data file and encrypted data record is found, the system user can effect a printing of the application 20 or a transmission of the application data to a remote processing location 21 (see FIG. 3). The data-locking system 10 can be appropriately programmed to effect either of these operations or both of them in a predetermined sequence, by further programming the sequencing circuitry 22 to include such a feature.

Referring to FIG. 2, an agreement form 19 is provided by the system user to the applicant subsequent to initiation of the data-lock process. Completion of this form 19 requires that the applicant or the system user transpose the data-lock code number 16 and the time stamp 17 to the top of the agreement form 19, and either initial or sign adjacent to such handwritten transposition of these numbers. The agreement form 19 is a representation of the understanding of the applicant as to the application process using the data-locking system 10. The agreement form 19 may also explain that application data fields denoted with an asterisk cannot be changed once a data-lock process has been initiated. Furthermore, the agreement form 19 may explain that any changes desired by the applicant once a data-lock process has been initiated must be made using existing procedures.

Once the encrypted data record and the critical data file are found to contain identical data within their respective data fields, the printing process requires that each page of the application 20 contain both the time stamp 17 and data lock code number 16 as generated by the data-lock process. The further processing of the application 20 requires that the a clerk or system user match an application number 35, the data-lock code number 16 and the time stamp 17 on each printed page, to the corresponding fields written on the agreement page 19. If the application number 35, data-lock code number 16 or time stamp 17 on each printed page does not match the agreement page 19, the application 20 will not be processed any further. The printed application 20 will reflect an asterisk or other predetermined marking adjacent to the critical data fields which were similarly designated with an asterisk on the video display screen 12 of the data entry device 11.

The clerk or the system user is also required to attach the agreement page 19 to the printed application 20 once the printing process is complete.

Referring to FIG. 3, the data-locking system 10 may comprise a printer 34. The printer 34 may be located at the remote processing location 21 or with the data entry device 11, as a separate component. The data-locking system 10 requires that the printing of an application 20 result from a direct link of the storage medium 15 with the printer 34. A direct link, in this instance, is defined as a coupling without the use of storage buffers or intervening memory devices. The printer 34 may comprise a Diconix model printer manufactured by Kodak or printing devices manufactured by Epson. Other unnamed printing devices, are equally applicable to the task.

Once a successful comparison of the encrypted data record and the critical data file occurs, the contents of the non-critical data file can be used to provide the data necessary to print an application 20, or transfer application data to a remote processing location 21.

What is claimed is:

1. A data-locking system comprising
    a data entry device having a keyboard for inputting information including data,
    at least one video display screen for displaying inputted information in a predetermined application format,
    a storage medium for storing information, and
    means for locking at least some of the inputted data in said storage medium to maintain the integrity of said data.

2. A data-locking system as in claim 1 wherein said data entry device is a portable personal computer.

3. A data-locking system as in claim 1 wherein said data entry device is a Honeywell Bull APL model 286 Supersport.

4. A data-locking system as in claim 1 wherein said data entry device is a Honeywell Bull APL model SXL 386 SX Supersport.

5. A data-locking system as in claim 1 wherein said data entry device includes circuit means for displaying at least portions of said predetermined application format on said screen for inputting information in said storage medium in conformance with said format.

6. A data-locking system comprising
    a data entry device having a keyboard for inputting information,
    at least one video display screen for displaying inputted information from said data entry device in a predetermined application format comprising an integrated arrangement of at least one critical data field and at least one non-critical data field,
    a storage medium for storing information inputted from said data entry device,
    means for locking at least some of the inputted information from said data entry device in said storage medium,
    means for generating a first record of data from the inputted information corresponding to said data fields, and
    means for generating a second record of critical data from said first record and corresponding to said critical data field.

7. A data-locking system as in claim 6 wherein said data storage medium is removably mounted in said portable data device.

8. A data-locking system as in claim 6 which further comprises
    means for encrypting data contained in said first record to enhance data security;
    means for generating a data-lock code number to include as part of said second record;
    means for generating a time stamp number to include as part of said second record; and means for generating a unique generator key number for use by said encryption means.

9. A data-locking system as in claim 8 which further comprises means for calculating a cyclical redundancy check number using data contained in at least one said critical data field and means for passing said cyclical redundancy check number to said second record.

10. A data-locking system as in claim 9 wherein said means for calculating said cyclical redundancy check number includes
a CRC table comprising a plurality of entries stored in said storage medium; and
cyclical redundancy check circuitry located in said data entry device programmed to generate a plurality of third temporary numbers, at least one third temporary number combining in a predetermined manner with the data contained in at least one of said critical data fields contained in said first record, and with at least one entry of said CRC table.

11. A data-locking system as in claim 10 wherein said cyclical redundancy check circuitry is programmed to
generate a first one of said third temporary numbers by combining a first constant with at least one bit of the data contained in at least one said critical data field of said first record;
generate a second one of said third temporary numbers by combining a second constant with said first one of said third temporary numbers resulting in an index to one of said entries in said CRC table; and
combine said indexed entry with a third one of said third temporary numbers resulting in said cyclical redundancy check number.

12. A data-locking system as in claim 8 wherein said means for encrypting data includes encryption circuitry for encrypting data in a predetermined manner.

13. A data-locking system as in claim 8 wherein said means for generating said data lock code number includes circuitry in said device programmed to combine data contained in at least two of said critical data fields in a predetermined manner.

14. A data-locking system as in claim 13 wherein said data lock code circuitry is programmed to
access said first record;
select at least a portion of at least one said critical data field of said first record;
generate a plurality of first temporary numbers from predetermined sub-portions of said portions; and
combine at least one said sub-portion with at least one predetermined data-lock constant resulting in said data-lock code number.

15. A data-locking system as in claim 8 wherein said means for generating said time stamp includes time stamp circuitry in said data entry device programmed to accept timing data from a discrete programmable timing unit.

16. A data-locking system as in claim 8 wherein said means for generating said unique generator key number includes generator key number circuitry in said data entry device programmed to combine data contained in at least two of said critical data fields in a predetermined manner.

17. A data-locking system as in claim 16 wherein said generator key number circuitry is programmed to combine at least a portion of said data-lock code number with at least a portion of said time stamp number in a predetermined manner.

18. A data-locking system as in claim 8 wherein said means for encrypting data comprises encryption circuitry programmed to combine said unique generator key number with the data contained in each said critical field of said first record.

19. A data-locking system as in claim 18 wherein said encryption circuitry is programmed to
(a) generate at least one second temporary number comprising the sum of at least two digits of said unique generator key number;
(b) calculate an encryption constant as a function of a first one of said second temporary numbers;
(c) read an Nth bit of data contained in said first record with N initially equal to 1;
(d) combine said Nth bit of data with said encryption constant and at least one digit of said unique generator key number to create an Nth encrypted bit;
(e) write said Nth encrypted bit to said second record;
(f) increment said encryption constant;
(g) increment N; and
(h) repeat (c) through (g) until all said critical data fields of said first record are encrypted.

20. A data-locking system as set forth in claim 8 further comprising a comparator for receiving and comparing said first record with said second record.

21. A data-locking system as in claim 20 wherein said comparator is located in said data entry device.

22. A data-locking system as in claim 20 further comprising a printer connected to said data entry device for receiving and printing an application containing the data of said first record.

23. A data-locking system as in claim 22 wherein said data entry device includes means for calculating a cyclical redundancy check number using data contained in at least one said critical data field and wherein said comparator includes
means for receiving at least one bit of an encrypted first record and at least one bit of said second record; and
means for comparing said encrypted first record with said second record.

24. A data-locking system as in claim 1 wherein said storage medium is a RAM memory.

25. A method of generating an application comprising the steps of
inputting information into a storage medium in conformance with a predetermined application format having predetermined critical and non-critical data fields therein to generate a first record;
initiating a data-lock to store information contained in selected data fields of the first record within the storage medium; and
encrypting a predetermined portion of the first record, said portion corresponding to the critical data fields for storage as a second record in the storage medium.

26. A method as set forth in claim 25 further comprising the step of
generating a data-lock code number to include as part of the second record;
generating a time stamp number to include as part of the second record; and
generating a unique generator key number for use in the encrypting step.

27. A method as set forth in claim 26 wherein the step of generating the unique generator key number comprises the step of combining data contained in at least two of the critical data fields of the first record in a predetermined manner.

28. A method as set forth in claim 27 wherein the step of generating the unique generator key number comprises the step of combining at least a portion of the data-lock code number with at least a portion of the time stamp number in a predetermined manner.

29. A method as in claim 25 wherein the step of encrypting the predetermined portion of the first record comprises the steps of
    (a) generating at least one second temporary number comprising the sum of at least two digits of the unique generator key number;
    (b) calculating an encryption constant as a function of a first one or said second temporary numbers;
    (c) reading an Nth bit of data contained in the first record with N initially equal to 1;
    (d) combining the Nth bit of data with the encryption constant and at least one digit of the unique generator key number to create an Nth encrypted bit;
    (e) writing the Nth encrypted bit to the second record;
    (f) incrementing the encryption constant;
    (g) incrementing N; and
    (h) repeating steps (c) through (g) until all the critical data fields of the first record are encrypted.

30. A method as set forth in claim 26 wherein the step of generating the time stamp number comprises the steps of accessing a discrete programmable timing unit and accepting timing data from the timing unit.

31. A method as set forth in claim 26 wherein the step of generating the data-lock code number comprises the steps of
    accessing the first record;
    selecting at least a portion of at least one of the critical data fields of the first record;
    generating a plurality of first temporary numbers from predetermined sub-portions of said portions of the critical data fields;
    accessing data from a timing unit; and
    combining at least one of said sub-portions with at least one bit of the data accessed from the timing unit resulting in said data-lock code number.

32. A method as set forth in claim 25 further comprising the step of calculating a cyclical redundancy check number.

33. A method as set forth in claim 32 wherein the step of calculating the cyclical redundancy check number comprises the steps of
    establishing a CRC table with a plurality of entries stored therein;
    generating a plurality of third temporary numbers; and
    combining at least one of the plurality of third temporary numbers in a predetermined manner with the data contained in at least one of the critical data fields of the first record and with at least one entry of the CRC table.

34. A method as set forth in claim 33 wherein the step of calculating the cyclical redundancy check number further comprises the steps of
    generating a first one of the third temporary numbers by combining a first constant with at least one bit of the data contained in at least one of the critical data fields of the first record;
    generating a second one of the third temporary numbers by combining a second constant with the first one of the third temporary numbers resulting in an index to one of the entries of the CRC table; and
    combining the indexed entry with a third one of the third temporary numbers resulting in the cyclical redundancy check number.

35. A method as set forth in claim 26 further comprising the step of comparing the second record with the first record.

36. A method as set forth in claim 35 wherein the step of comparing comprises the steps of
    encrypting the first record to create an encrypted data record;
    sending at least a first bit of a predetermined critical data field of the encrypted data record and at least a corresponding first bit of the second record to a comparator; and
    comparing at least the first bit of the encrypted data record with at least the corresponding first bit of the second record to determine a match.

37. A method as set forth in claim 36 wherein the comparison of records further comprises the step of terminating the comparison in response to a mismatch of any bit of the encrypted data record with the corresponding bit of the second record.

38. A method as set forth in claim 36 further comprising the step of printing an application in response to the determination of a match.

39. A method as set forth in claim 38 wherein the step of printing the application comprises the step of
    passing the contents of the first record to a printer; and
    printing the application according to the predetermined application format.

40. A method as set forth in claim 25 wherein the step of inputting information comprises the steps of
    displaying on a video display screen at least predetermined portions of the predetermined application format; and
    displaying on the video display screen the inputted information after inputting.

41. A method as set forth in claim 36 further comprising the step of electronically transmitting the second record from a data entry device to a remote processing location.

42. A data-locking system comprising
    a data entry device having a keyboard for inputting information,
    at least one video display screen for displaying inputted information in a predetermined application format, said predetermined application format comprising an integrated arrangement of at least one critical data field and at least one non-critical data field,
    means for generating a first record of data from the inputted information corresponding to said data fields,
    means for generating a second record of critical data from said first record and corresponding to said critical data file,
    means for encrypting data contained in said first record to secure the data from tampering,
    means for generating a data-lock code number to include as part of said critical data record,
    means for generating a unique generator key number for use in said encryption of data contained in said first record,
    a comparator for comparing said first record with said second record, and means for prohibiting access to said first and second records of said data-locking system upon the occurrence of a predetermined event.

43. A data-locking system as in claim 42 wherein said means for prohibiting access to said first and second records comprises lockout circuitry programmed to prohibit access to said data-locking system upon said comparison of said first and second records yielding a mismatch.

44. A method of generating an application comprising the steps of inputting information into a storage medium in conformance with a predetermined application format having predetermined critical and non-critical data fields therein to generate a first record;

initiating a data-lock to store information contained in selected data fields of the first record within the storage medium;

encrypting a predetermined portion of the first record, said portion corresponding to the critical data fields for storage as a second record in the storage medium;

generating a data-lock code number to include as part of said second record;

generating a unique generator key number for use in said encrypting step;

comparing said first record with said second record; and initiating a system lockout if said comparing step yields a mismatch.

* * * * *

UNITED STATES PATENT AND TRADEMARK OFFICE
CERTIFICATE OF CORRECTION

PATENT NO. : 5,027,395

DATED : June 25, 1991

INVENTOR(S) : RICHARD J. ANDERSON, et al

It is certified that error appears in the above-identified patent and that said Letters Patent is hereby corrected as shown below:

Column 10, line 60 change "data device" to -data entry device-

Column 13, line 13 change "or" to --of--

Signed and Sealed this

Twenty-ninth Day of December, 1992

Attest:

DOUGLAS B. COMER

Attesting Officer

Acting Commissioner of Patents and Trademarks